Dec. 17, 1968            J. L. KNAK            3,417,306
REGULATED VOLTAGE CAPACITOR DISCHARGE CIRCUIT
Filed Feb. 9, 1965
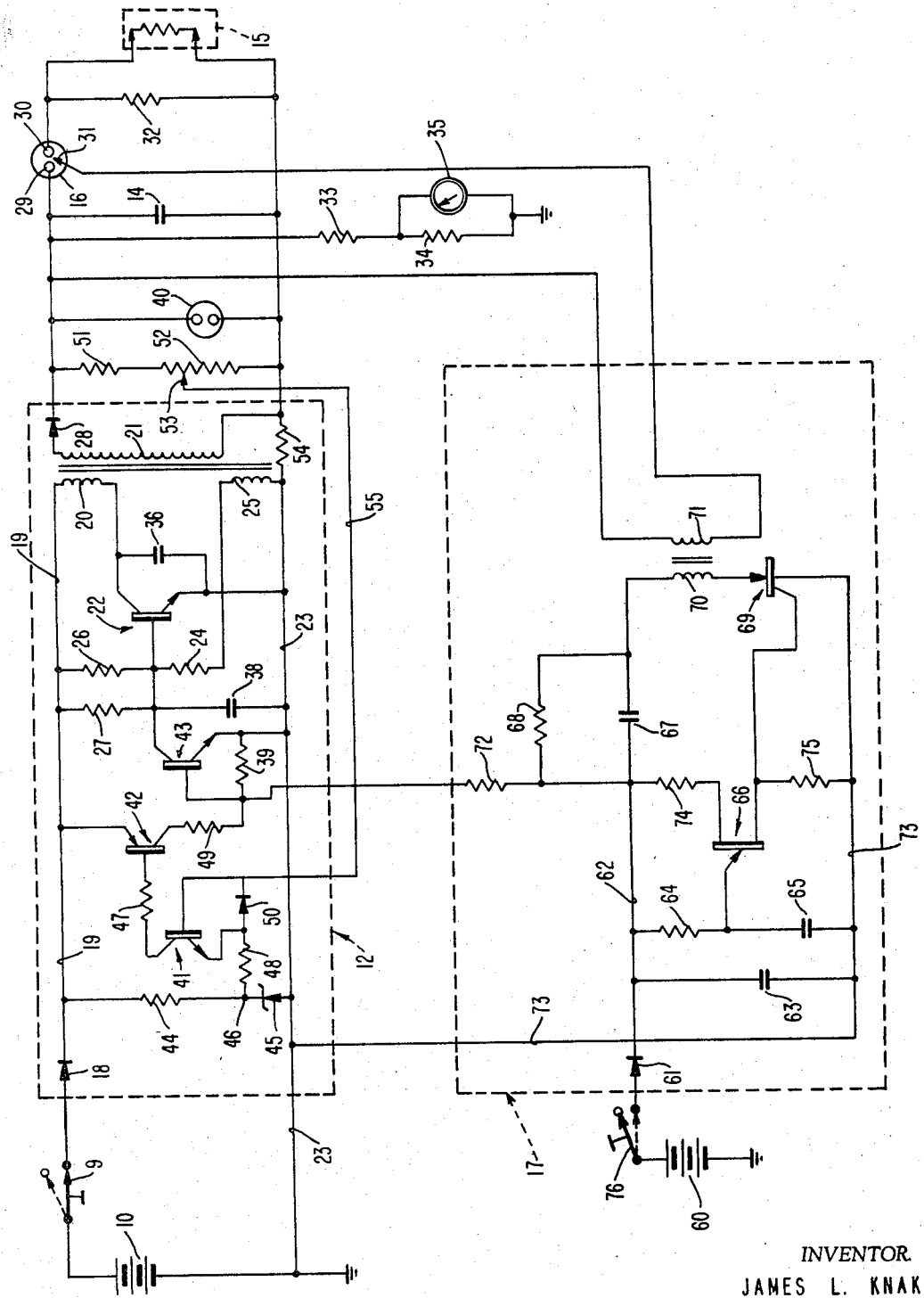
INVENTOR.
JAMES L. KNAK
BY *Bauer and Seymour*
ATTORNEYS

United States Patent Office 3,417,306
Patented Dec. 17, 1968

3,417,306
REGULATED VOLTAGE CAPACITOR
DISCHARGE CIRCUIT
James L. Knak, Sidney, N.Y., assignor to The Bendix
Corporation, a corporation of California
Filed Feb. 9, 1965, Ser. No. 431,418
7 Claims. (Cl. 320—1)

ABSTRACT OF THE DISCLOSURE

Electrical system for firing an explosive bridge wire device or the like comprising an arming circuit capable of charging and maintaining a predetermined maximum charge on a storage capacitor and a triggering circuit with time delay means for releasing the charge on the capacitor for discharge across the bridge wire device or other load.

---

This invention relates to electrical apparatus and more particularly to means for controlling or regulating the charge on a storage condenser or other reservoir of stored electrical energy.

An object of the present invention is to provide novel electrical apparatus for maintaining a stored charge of electrical energy, such as the charge on a condenser, at or near a predetermined level.

Another object of the invention is to provide novel electrical circuitry, whereby means, such as a condenser, for storing electrical energy is continuously replenished or recharged without danger of the same being overcharged beyond a predetermined voltage level.

Still another object of the invention is to provide novel means for maintaining the charge on a storage condenser or the like with maximum efficiency.

A still further object is to provide apparatus whereby a condenser or the like electrical energy storage means may be rapidly charged to and maintained at or near a predetermined voltage level with a minimum of input power and a minimum average current flow in the supply circuit.

Another object is to provide a novel electrical system for firing electrically energized squibs and like firing units, such as explosive bridge wire devices.

Another object is to provide a novel method for regulating the charge stored on a condenser or other reservoir of stored electrical energy.

The above and further objects and novel features of the invention will more fully appear from the following detail description when the same is read in connection with the accompanying drawing. It is to be expressly understood, however, that the drawing is for purpose of illustration only and is not intended as a definition of the limits of the invention.

In the drawing, the single figure is a schematic diagram of one form of electrical circuit embodying the invention.

A single embodiment of the invention is illustrated in the drawing, by way of example, in the form of an electrical system adapted for use in energizing an explosive bridge wire type firing unit or initiator referred to in some applications as a squib. The invention is, of course, adapted to many other uses in connection with specifically different systems and circuitry. In the illustrated embodiment, a suitable source of electrical energy, such as a battery 10, is connected, preferably through suitable radio frequency filtering means (not shown) of known construction, to a regulated arming or supply circuit 12 for charging and maintaining a predetermined charge on a storage condenser 14. The latter is maintained in charged condition for quickly energizing and firing an initiator, such as the schematically illustrated explosive bridge wire unit 15 connected across the condenser through a hold-off gap-switch 16. The latter may be triggered and thus rendered conductive to the charge on condenser 14 at the will of an operator or automatically by suitable programming means by a triggering or pulse generating circuit, one suitable form of which is illustrated at 17.

The positive terminal of battery 10 or other suitable source of electrical energy is connected through a diode 18 and by an input lead 19 to one end of the primary winding 20 of a step-up power transformer having a secondary winding 21. Diode 18 protects the system against damage in the event it is improperly connected to source 10. The other end of the primary winding is connected to the other or ground terminal of the source 10 through the collector and emitter terminals of a transistor 22 and a common return lead 23.

The transistor 22 forms part of a so-called ringing choke oscillator which functions in a well-known manner to periodically interrupt the flow of current through primary winding 20 to thereby induce a voltage across secondary winding 21 which is substantially in excess of the battery or source voltage. In a typical system, a battery voltage ranging from 24 to 36 volts is stepped up to charge condenser 14 to a voltage of at least 2500 volts. The transistor oscillator further comprises a feedback circuit across the emitter and base terminals of transistor 22 including a resistor 24 and a tertiary control winding 25 inductively coupled to primary winding 20. The base terminal of the transistor is also connected to input lead 19 by a resistor 26 and, if desired, a resistor 27 having a large positive temperature coefficient may be connected in parallel with resistor 26 to effect temperature compensation when required. Thus, the magnitude of the current which will flow through primary winding 20 in the collector-emitter circuit of transistor 22 will be determined by the gain characteristics of the transistor and the magnitude of the base to emitter current which is primarily generated in a manner to be next described. Sufficient base to emitter current flows from input lead 19 through resistance bank 26, 27 to initiate collector to emitter conduction when the circuit to the battery is closed at switch 9.

As current flow increases through primary winding 20 in the collector-emitter circuit of transistor 22, a voltage is induced in tertiary winding 25 to create further current flow in the base to emitter circuit, thereby increasing the current carrying ability of the collector to emitter circuit. When current flow in primary winding 20 reaches a peak determined by the Beta (gain) of the transistor and the base to emitter current, no further voltage is induced across tertiary winding 25 by current change in primary winding 20. This initiates a degenerative action whereby the base to emitter junction becomes reverse biased, causing complete turn-off of the transistor which in turn results in rapid decay of the current in primary winding 20 and consequent inductive transfer of power to secondary winding 21. This cycle of operation of the transistor oscillator is automatically repetitive, and condenser 14 may accordingly be charged through a suitable rectifier, such as diode 28, in a step-by-step manner to a voltage many times greater than the voltage of source 10, but below the normal breakdown voltage of the main gap between anode 29 and cathode 30 of gap-switch 16. When it is desired to fire device 15, a triggering voltage is applied by pulse generating circuit 17 across the more closely spaced electrodes 29 and 31 of switch 16 to thereby ionize the gap 29–30 and render it conductive to the charge on condenser 14. A resistance 32 may be connected between cathode 30 of switch 16 and common lead 23 and hence, in parallel with the bridge wire of device 15.

If desired, a small portion of the energy stored on condenser 14 may be bled off through a voltage divider comprising resistances 33 and 34 and utilized, by way of example, to energize a monitor 35 to provide an indication of the charge acquired by the condenser, and hence, provide assurance that the system is suitably armed and operative. In some applications, it may be desirable to connect a safety gap 40 across the terminals of tank condenser 14, the breakdown voltage of which is somewhat in excess of the desired maximum voltage on the condenser but less than the normal breakdown voltage of hold-off gap 29–30. The safety gap thus avoids any possibility of gap 29–30 becoming conductive in the absence of a triggering pulse from circuit 17.

In some applications of the above-described circuitry, it is desirable that the same be capable of charging the tank condenser rapidly to a high voltage within a predetermined range and of maintaining the charge within that range for extended periods in readiness for firing the device 15 or for energizing any other load circuit. The present invention contemplates novel and effective means for efficiently accomplishing this desired result. Said means function in response to the charge on the condenser and by comparing a voltage proportional to the voltage of the stored charge to a substantially fixed reference voltage, the magnitude of which is independent of the normal variation of the voltage of source 10. A predetermined difference between the compared voltages is utilized in a novel manner to control transistor 22 and hence, the transfer of energy to condenser 14.

In the illustrated embodiment, the novel means comprehended by the invention for regulating the voltage of the charge stored on condenser 14 is shown as comprising a three-stage transistor amplifier which includes three normally non-conductive transistors 41, 42 and 43. A predetermined reverse bias voltage is applied to the emitter terminal of transistor 41 by means of a resistance 44 and Zener diode 45 connected in series across the source 10, said emitter terminal being connected to the junction 46 between said resistance and diode. The elements 44 and 45 are chosen to maintain at junction 46 a predetermined fixed voltage below the minimum output voltage of source 10. The collector-emitter junction of transistor 41 is connected between leads 19 and 23 and hence, across source 10 through the emitter to base junction of transistor 42, a resistor 47 and Zener diode 45. If desired or necessary, a temperature compensating resistor 48 may be connected in this circuit. The emitter-collector junction of transistor 42 is connected across leads 19 and 23 and hence, across source 10 through a resistor 49 and the base to emitter junction of transistor 43. A temperature compensating resistor 39 may be connected across the base and emitter terminals of transistor 43, and the collector to emitter junction of said transistor is connected across tertiary winding 25 in series with resistor 24 and between leads 19 and 23 in series with resistor 26.

The input transistor 41 of the amplifier circuit described above may be rendered conductive and the amplifier thus rendered operative by applying a drive voltage to the base terminal thereof which is sufficiently in excess of the fixed reference voltage at junction 46 to override said reference voltage and the impedance of the base to emitter junction of the transistor. In accordance with the invention, such a voltage is applied to the base of transistor 41 whenever the potential of the charge on condenser 14 is built up to a predetermined maximum voltage. For this purpose, a voltage divider, which may be of the variable type and comprises resistances 51 and 52, is connected across condenser 14. The voltage divider is tapped at 53 and connected by a lead 55 to the base terminal of transistor 41. A voltage which is proportional to the charge on the condenser is thus continually applied to said base terminal in opposition to the reference voltage determined primarily by Zener diode 45.

When the charge on condenser 14 reaches its desired maximum potential, the comparison voltage supplied by the condenser through voltage divider 51, 52 will exceed the fixed reference voltage, and a small base to emitter current will flow in transistor 41. During the continuance of this condition, transistors 41, 42 and 43 will be rendered conductive in a manner well understood in the art, and transistor 43 will become effective to divert some of the current fed to or generated by winding 25 in the base to emitter circuit of transistor 22 in the manner above described. The capability of transistor 43 to by-pass base current from transistor 22 will be determined in part by the magnitude of the amplified current which flows in the base to emitter circuit of transistor 43.

Since the magnitude of the current which will be conducted by the collector to emitter junction of transistor 22 and hence, the magnitude of the current through primary winding 20 is determined in part by the magnitude of the base to emitter current, it will be seen that shunting some of the feed-back current generated by tertiary winding 25 in the base to emitter circuit of transistor 43 will result in a decreased maximum current flow through primary winding 20 and hence, decreased transmission of energy to secondary winding 21 and condenser 14. The gain of the amplifier circuit, including transistors 41 to 43, and other parameters of the circuitry are so chosen that the system will function to rapidly charge condenser 14 to a predetermined high voltage and to thereafter supply just sufficient energy from source 10 through the transistor oscillator to compensate for energy leaked or bled from the storage condenser and hence, to maintain a desired charge within relatively narrow limits on condenser 14.

A diode 50 may be connected across the emitter and base terminals of transistor 41 to protect the latter against any excess voltage before condenser 14 is charged, and a condenser 36 may be connected across the collector and emitter terminals of transistor 22 to protect the latter from high peak voltages. A resistance 54 may be inserted in the common conductor 23 between the ends of windings 21 and 25 to suitably isolate the secondary from the power supply circuit.

One form of suitable pulse generating means for triggering gap-switch 16 is illustrated generally at 17 as comprising a source of electrical energy, such as battery 60, which is connected through a switch 76, lead 62, diode 61 and lead 73 to charge a storage condenser 63. If desired, source 60 may be common with source 10. The primary winding 70 of a transformer is connected across the condenser 63 in series with the anode and cathode terminals of a normally non-conductive silicon control switch 69. Means are provided for rendering switch 69 conductive to the charge on condenser 63, and as shown, such means comprises a unijunction transistor 66 controlled by a time delay circuit consisting of a resistor 64 and condenser 65 connected in series across source 60. The emitter terminal of transistor 66 is connected to the junction between resistor 64 and condenser 65, the Base two terminal thereof is connected to input terminal 62 through a resistor 74, and the Base one terminal is connected to the gate or control terminal of switch 69. A resistor 75 is also interposed between said Base one terminal and common lead 73.

Upon closure of switch 76, condensers 63 and 65 are simultaneously charged by source 60. After a predetermined delay, which is dependent upon the charging rate of condenser 65 through resistor 64, the charge on said condenser attains the threshold voltage of transistor 66, whereupon condenser 65 discharges across the emitter to Base one junction of said transistor and the gate to cathode junction of switch 69 to render the latter conductive. This permits the discharge of tank condenser 63 through primary winding 70 and switch 69 to induce a voltage across a secondary winding 71 across which electrodes 29 and 31 of gap-switch 16 are connected. The resulting discharge between electrodes 29 and 31 ionizes the main gap 29–30 and releases the charge on condenser 14 in the manner and for the purpose herein previously described. If it is desired to apply but a single triggering pulse to primary winding 70 and hence, to switch 16, a condenser 67 in parallel with a resistor 68 may be inserted in lead 62 in the discharge circuit of condenser 63.

If as in some installations it is desired to immobilize the arming or charging circuit 12 while switch 76 is closed to energize circuit 17, this may be accomplished by connecting input lead 62 through a resistance 72 to the base terminal of transistor 43. The magnitude of the current generated in the base to emitter circuit of transistor 43 when the latter is thus connected in circuit with source 60 will be sufficient to render the collector-emitter junction of the transistor capable of diverting sufficient base current from transistor 22 to cause the latter to cease oscillation so that no further appreciable energy will be transferred to the secondary circuit and hence, to condenser 14. The arming circuit may also be rendered inoperative by opening switch 9.

In one satisfactorily operable system supplied by a battery having an output voltage ranging from 24 to 36 volts and including a tank condenser 14 to be charged to and maintained at a voltage within the range of 2200 to 2400 volts, the following elements of the arming circuit had the values or were of the types indicated below:

| | | |
|---|---|---|
| Resistor 44 | ohms | 4.7K. |
| Resistor 47 | do | 3.3K. |
| Resistor 48 | do | 2.2K. |
| Resistor 49 | do | 1.0K. |
| Resistor 26 | do | 39K. |
| Resistor 27 | do | 5.6K. |
| Resistor 24 | ohms | 330 |
| Resistor 51 | megohms | 20 |
| Resistor 52 | ohms | 82.5K. |
| Resistor 54 | do | 1K. |
| Resistor 32 | do | 3K. |
| Resistor 33 | megohms | 5 |
| Resistor 34 | ohms | 10K. |
| Resistor 72 | do | 2.7K. |

| | |
|---|---|
| Condenser 14 | 1.0 Mfd., 3 kv. |
| Diode 18 | Type 1N645 |
| Diode 28 | Type MC 8122 |
| Diode 45 | Type 1N757A |
| Diode 50 | Type 1N645 |
| Transistor 41 | Type 2N929 |
| Transistor 42 | Type 2N859 |
| Transistor 43 | Type 2N1479 |
| Transistor 22 | Type MHT4454 |
| Gap-Switch 16, breakdown voltage volts | −4500 |
| Safety Gap 40, breakdown voltage do | −2800 |
| Primary 20, T. #28 | 120 |
| Secondary 21, T. #44 | 8000 |
| Tertiary 25, T. #32 | 50 |

There is thus provided a novel and useful apparatus and method for charging and maintaining a charge on an electrical condenser or the like with maximum efficiency and safety. The novel system provided is adapted to many uses other than the ignition of explosive bridge wire type, shunted surface gap type, and other types of initiators or squibs. In addition, the system is flexible and yet extremely reliable under a wide range of temperatures. It may be packaged in a small space and is rugged and hence capable of withstanding vibrations of considerable magnitude in normal usage.

Although only a single embodiment of apparatus including the invention has been illustrated in the accompanying drawing and described in the foregoing specification, it is to be expressly understood that the invention is not limited thereto. For example, many variations which will now be apparent to those skilled in the art may be made in the types of components and the values thereof above suggested. For example, it will be apparent to skilled artisans that different types of semi-conductive or solid state switching devices may be substituted for the types illustrated and that suitable variations may be made in the circuitry to accomplish the desired result in accordance with the novel method disclosed. Many known types of triggering circuits may be used in lieu of circuit 17 to trigger gap-switch 16, and other known types of sources of electrical energy may be substituted for batteries 10 and 60.

What is claimed is:

1. Electrical apparatus comprising a direct current source of electrical energy, a transformer comprising primary, secondary and control windings, transistor oscillator means comprising a transistor having its collector and emitter terminals connected in series with said primary winding across said source and its base and emitter terminals connected across said control winding, said transistor having alternate conductive and non-conductive intervals during each oscillatory cycle, current rectifying means and a capacitor connected in series across said secondary winding, a resistance voltage divider connected across said capacitor and having an adjustable center tap (amplifier means connected across said source comprising an input stage transistor and means for maintaining substantially constant the reverse bias voltage applied to the emitter terminal of said input stage transistor, means connecting the control terminal of said input stage transistor of said amplifier means to said center tap whereby said amplifier means is conductive only when the voltage of the charge on said capacitor exceeds a predetermined value, and means connecting the output terminals of said amplifier means across said control winding, whereby to control the conductivity of said first-named transistor during the conduction intervals thereof.

2. Electrical apparatus comprising a direct current source of electrical energy, a transformer comprising primary, secondary and control windings, vibrator means comprising a transistor having its collector and emitter terminals connected in series with said primary winding across said source and its base and emitter terminals connected across said control winding, rectifier means and a storage capacitor connected in series across said secondary winding, current amplifying means connected across said source comprising an input stage transistor and an output stage transistor, means for applying a fixed reverse biasing voltage to the emitter terminal of said input stage transistor to render the same non-conductive, means including a resistor connecting the base terminal of said input stage transistor to the high potential terminal of said capacitor for applying a sufficient forward biasing potential thereto to render said input stage transistor conductive when the charge on said capacitor exceeds a predetermined value, and means connecting said control winding across the collector and emitter terminals of said output stage transistor and for connecting the base terminal of said first-named transistor to the collector terminal of said output stage transistor.

3. Electrical apparatus as defined in claim 2 wherein said resistor is part of a resistance voltage divider connected across said capacitor.

4. Electrical apparatus as defined in claim 2 wherein said means for applying a fixed reverse biasing voltage to the emitter terminal of said input stage transistor comprises a resistance and a Zener diode connected in series across said source.

5. Electrical apparatus as defined in claim 4 wherein the magnitude of said fixed reverse biasing voltage is below the minimum output voltage of said source.

6. Electrical apparatus comprising a source of electrical energy, a transformer comprising a primary winding connected to said source and a secondary winding, a solid state switch oscillator connected to intermittently interrupt current flow from said source through said primary winding, said iscillator including a transistor having collector and emitter terminals in series with said primary winding, said oscillator further including a control winding inductively coupled with said primary winding and connected across the base and emitter terminals of said transistor, electrical energy storage means connected to be energized by said secondary winding, means responsive to the voltage of the charge stored in said storage means for controlling the magnitude of the drive current through said oscillator, said last named means comprising a normally non-conductive switching device connected across said control winding, and means responsive to the charge on said energy storage means for rendering said switching device conductive comprising a second transistor, means for applying a substantially fixed reverse bias voltage to the emitter terminal of said second transistor, and means for applying to the control terminal of said second transistor a forward bias voltage which is proportional to the voltage of the charge on said energy storage means.

7. Electrical apparatus comprising a source of electrical energy, a transformer comprising a primary winding connected to said source and a secondary winding, a solid state switch oscillator connected to intermittently interrupt current flow from said source through said primary winding, said oscillator including a transistor having collector and emitter terminals in series with said primary winding, said oscillator further including a control winding inductively coupled with said primary winding and connected across the base and emitter terminals of said transistor, electrical energy storage means connected to be energized by said secondary winding, means responsive to the voltage of the charge stored in said storage means for controlling the magnitude of the drive current through said oscillator, said last named means comprising a normally non-conductive switching device connected across said control winding, and means responsive to the charge on said energy storage means for rendering said switching device conductive comprising a second transistor means for applying a substantially fixed reverse bias voltage to the emitter terminal of said second transistor, means for applying to the control terminal of said second transistor a forward bias voltage which is proportional to the voltage of the charge on said energy storage means, a hold-off gap for maintaining a charge on said energy storage means, means for triggering said gap to permit discharge of the energy storage means therethrough, and means for momentarily delaying the triggering of the gap a predetermined interval after energization of said triggering means.

References Cited
UNITED STATES PATENTS

| | | | |
|---|---|---|---|
| 2,946,924 | 7/1960 | Gerlach et al. | 320—1 X |
| 3,319,146 | 5/1967 | Kearsley | 320—1 |
| 3,275,884 | 9/1966 | Segall et al. | 315—241 X |
| 2,791,739 | 5/1957 | Light | 321—2 |
| 3,069,612 | 12/1962 | Hamilton | 321—2 |
| 3,113,275 | 12/1963 | Minter | 321—2 X |
| 3,114,096 | 12/1963 | Projain | 321—2 |
| 3,255,366 | 6/1966 | McNulty et al. | 317—80 X |

BERNARD KONICK, *Primary Examiner.*

J. F. BREIMAYER, *Assistant Examiner.*

U.S. Cl. X.R.

321—2; 317—241.80

UNITED STATES PATENT OFFICE
CERTIFICATE OF CORRECTION

Patent No. 3,417,306                      December 17, 1968

James L. Knak

It is certified that error appears in the above identified patent and that said Letters Patent are hereby corrected as shown below:

In the heading to the printed specification, line 5, "California" should read -- Delaware --.

Signed and sealed this 21st day of April 1970.

(SEAL)
Attest:

Edward M. Fletcher, Jr.                  WILLIAM E. SCHUYLER, JR.
Attesting Officer                           Commissioner of Patents